H. C. Carrigan.
Fire Escape.
N° 96,321. Fig. 1. Patented Sep. 28, 1869.
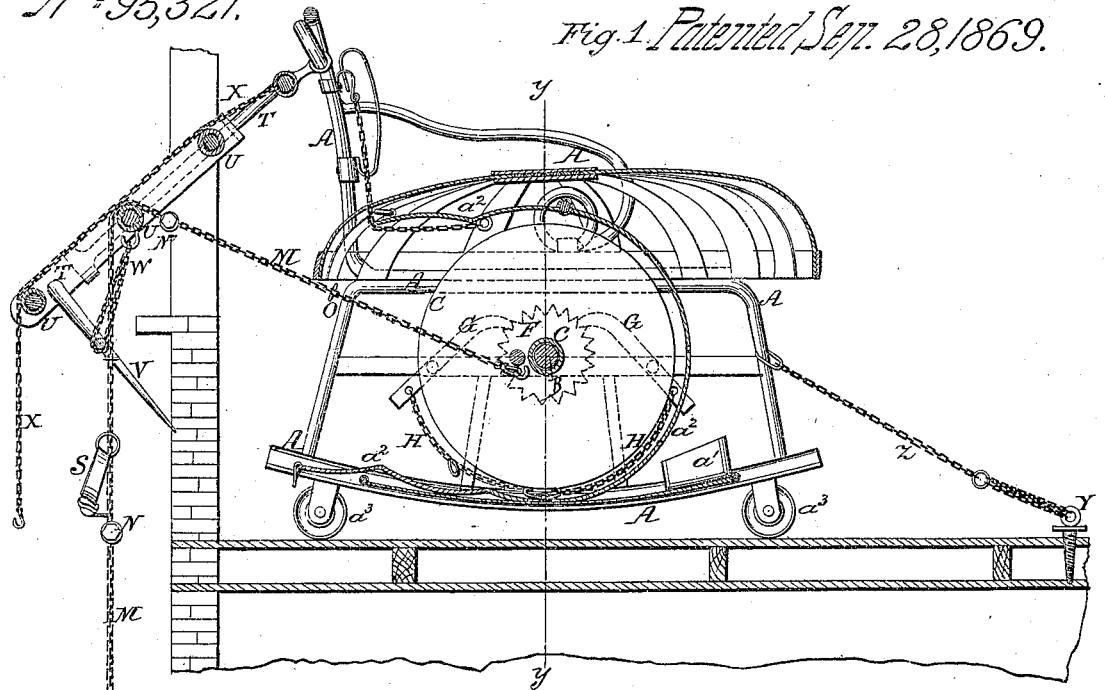
Fig. 2.
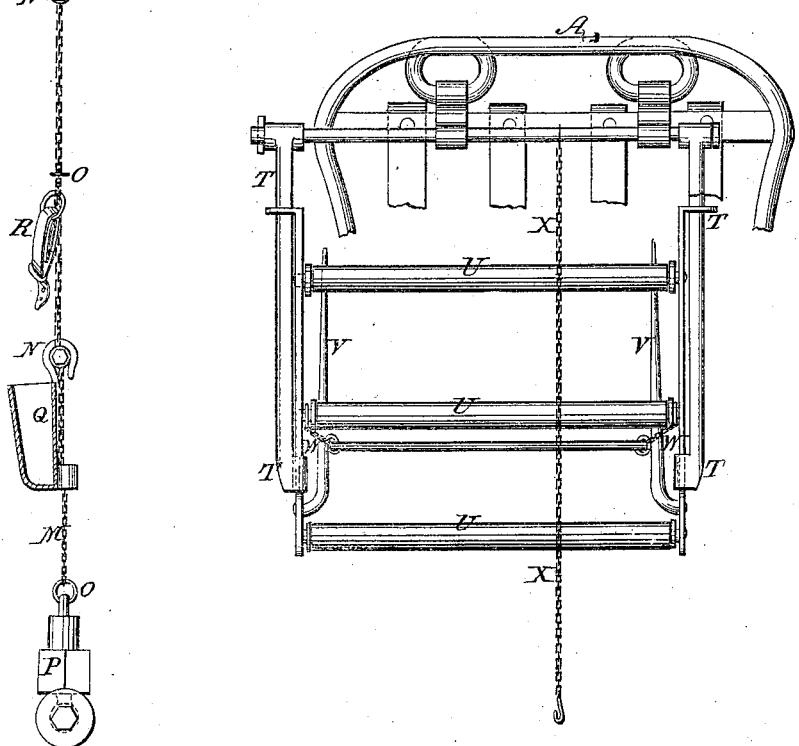
Witnesses
A. W. Almquist.
Alex. F. Roberts.
Inventor.
H. C. Carrigan
per Munn & Co
Attys Sheet 2-2 Sheets
H. C. Carrigan.
Fire Escape.
N° 95,321.     Fig. 3.     Patented Sep. 28, 1869.
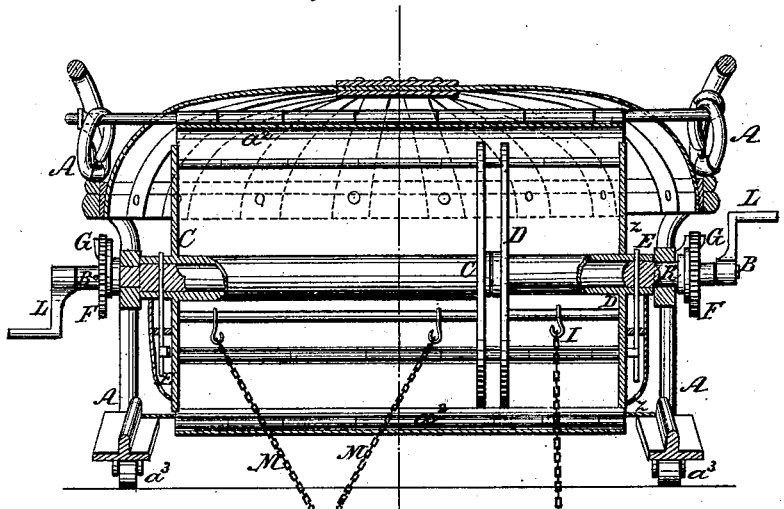
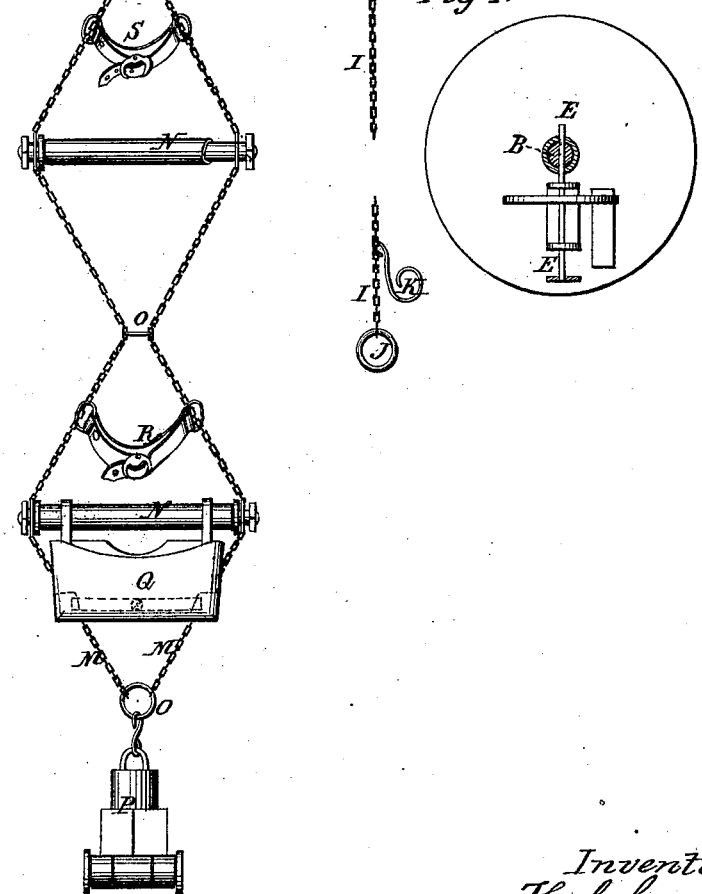
Fig. 4.
Witnesses.
A. W. Almquist
Alex T. Roberts
Inventor.
H. C. Carrigan
per Munn & Co.
Att'ys.

United States Patent Office.

HUGH C. CARRIGAN, OF NEW YORK, N. Y.

Letters Patent No. 95,321, dated September 28, 1869.

IMPROVED PORTABLE FIRE-ESCAPE.

The Schedule referred to in these Letters Patent and making part of the same.

*To all whom it may concern:*

Be it known that I, HUGH C. CARRIGAN, of the city, county, and State of New York, have invented a new and useful Improvement in Portable Fire-Escapes; and I do hereby declare that the following is a full, clear, and exact description thereof, which will enable those skilled in the art to make and use the same, reference being had to the accompanying drawings, forming part of this specification.

Figure 1 is a vertical longitudinal section of my improved fire-escape, taken through the line $x\ x$, fig. 3.

Figure 2 is a detail front view of the adjustable extension-frame.

Figure 3 is a vertical cross-section of the same, taken through the line $y\ y$, fig. 1.

Figure 4 is a detail sectional view of the same, taken through the line 33, fig. 3.

My invention has for its object to furnish an improved portable fire-escape, designed to be kept, by those occupying upper apartments, in their rooms, and which shall be so constructed and arranged that it will enable the occupants of the rooms to lower their property and themselves with speed and convenience to the ground, and which, when not in use, will present the appearance of being nothing but an ordinary chair, and may be used as such; and It consists in the construction and combination of the various parts of the machine, as herein more fully described.

A is the frame-work of the machine, which is made of iron, so as to be very strong, and, at the same time, sufficiently light to enable the machine to be easily moved about the room, as required. The frame A is made in the form of a chair, and may and should be so upholstered as to entirely cover up and conceal the fire-escape mechanism.

B is a shaft, crossing the middle part of the frame A, and revolving in bearings formed in or attached to said frame.

Upon the shaft B, within the frame A, are placed two reels or flanged drums, C and D, which are connected with the said shaft B by sliding bolts E passing through the said shaft, and through the sleeves of the said reels, with the ends of which they are connected, as shown in figs. 3 and 4, so that either or both reels may be carried with said shaft in its revolution; or either or both reels may be allowed to run freely upon said shaft, as may be desired.

To each end of the shaft B is attached a ratchet-wheel, F, upon the teeth of which the weighted pawls G take hold, to prevent the revolution of the shaft B in one or both directions, and to hold it securely in any desired position. One or two pawls G are pivoted to the frame A at each end of the shaft B.

The lower ends of the pawls G are provided with short chains H, which may be hooked upon hooks attached to the frame A, to hold the said pawls, or either of them, away from the ratchet-wheels, when desired.

L are detachable cranks, fitted upon the ends of the shaft B, to lower the load, either or both of which may be used, as convenience, or the weight of the load to be lowered, may render advisable.

To the sleeve of the smaller reel D, or to a cross-bar securely attached to said reel, and running parallel with and close to said sleeve, is attached one end of a chain, I, which should be of such a length as to considerably more than reach the ground.

To the free end of the chain I is attached a ring, J, and to said chain, a little above said ring, is attached a hook, K. The chain I J K is designed to be used for lowering furniture or other articles from the house. In using the chain, the body of the chain I is passed double through the ring J, to form a loop to receive a package or article of furniture. The body of the chain I may then be passed around another article or bundle, and secured with the hook K. The whole may then be lowered to the ground.

M are two chains, of sufficient length to reach the ground, the upper ends of which are fastened to the sleeve of the larger reel C, or to a cross-bar attached to said reel, and running parallel with and close to the said sleeve.

N are rounds or bars, the ends of which are secured to the chains M, and which are of such a length as to be received between the flanges of the reel C. The rounds N are placed a foot, more or less, apart, and are each made with a sleeve fitting loosely upon it to keep it cool, by the currents of air passing through said sleeve, should the ladder be exposed to fire or heat from the lower windows of the house.

The chains M, midway between the rounds N, are connected to each other by a ring or link, O. This keeps the chains in the middle part of the reel C, and thus prevents the possibility of the said chains becoming entangled or fouled upon the ends of the said rounds.

To the lower ends of the two chains M is attached a heavy weight, P, which is provided with wheels or rollers, so that when being lowered, if it should strike upon an awning, roof, or other obstruction, it may roll off and carry the lower end of the chain-ladder to the ground.

Q is an iron basket, which is provided with hooks to hook upon the lower round N. The basket Q is also provided with hooks to hook upon the chains M, below the said lower round, where the said hooks are kept in place by a button, or spring-catch or catches, attached to the rear side of the said basket. The basket Q is designed to receive the feet of the person or persons sitting upon the lower round N, while being lowered.

R is a strap, attached to the chains M above the lower round, and which is designed to be buckled around the waist of the person or persons sitting upon the said lower round, when, from the weakness or timidity of said person or persons, it may be necessary.

S is a strap, attached to the chains M, above the third round of the ladder from its lower end, and which is designed to be buckled around the waist of the person or persons who may be sitting upon said third round to be lowered, and who rest their feet upon the second round.

T is an extension-frame, the side bars of which slide upon each other, as shown in fig. 2. The frame T is designed to be passed out of the window for the chain I and chain-ladder M N O to pass over, while lowering persons or things to the ground. To enable said chain and ladder to be raised and lowered freely, loose sleeves or hollow rollers U are placed upon the outer cross-bars of the extension-frame T, as shown in figs. 1 and 2.

The inner cross-bar of the frame T passes through and slides in eyes or slides pivoted to the upper part of the frame A, to enable its position to be conveniently adjusted, as may be required, for operating the chain I and ladder M N O, either or both.

To the outer part of the extension-frame T are pivoted two brace-bars V, the lower ends of which are pointed, and which are designed to support the outer part of said frame, by resting against the wall of the building.

The position of the arms or knees V is adjusted to the requirements of the place in which the fire-escape is to be used, by adjustable chains W, connecting the middle parts of said braces V with the frame T, as shown in fig. 1.

The chain I and ladder M N O are designed to be passed over one or the other of the cross-bars of the frame T, as the circumstances of each case may render necessary, being placed further out when the flames or heat are escaping through the lower windows of the house.

X is a small chain, the inner end of which is secured to the frame A, and the outer end of which is provided with a hook, as shown in figs. 1 and 2.

The chain X is designed to be hooked around the waist of feeble and timid persons, while passing out of the window to their place upon the ladder. When such persons are secured to the ladder, the chain X should be detached from them.

Y is an eye or ring-bolt, which is designed to be permanently attached to the floor to serve as an anchor, to hold the machine while being used as a fire-escape.

Z is the chain, by means of which the frame A is connected with the bolt Y. One end of the chain Z is secured to the frame A, and its other end is secured to the said bolt Y. When not in use, the chain Z may be placed in the box or receptacle $a^1$, prepared in the forward part of the frame A to receive it.

The reels C and D, and the chain and ladder rolled upon them, are covered with a jointed casing, $a^2$, which may be opened and turned or folded back when the apparatus is to be used. At other times the said casing may be kept locked, to insure the apparatus being always in proper working-condition.

The frame A may be mounted upon caster-wheels $a^3$, as shown in figs. 1 and 3, or upon rockers, as may be desired or convenient.

Having thus described my invention,

What I claim as new, and desire to secure by Letters Patent, is—

1. The combination of the reels C D, either or both, shaft B, sliding bolts E, ratchet-wheels F, and pawls G, with each other and with the frame A, said parts being constructed and operating substantially as herein shown and described.

2. The ladder M N O, provided with the weight P, iron basket Q, and the straps R S, either or both, in combination with the reel C, shaft B, and frame A, substantially as herein shown and described, and for the purpose set forth.

3. The combination of the chain I, provided with the ring J and hook K, with the reel D, shaft B, and frame A, substantially as herein shown and described, and for the purpose set forth.

4. The ring or eye-bolt Y and chain Z, when used in connection with the frame A, to which the operating-mechanism of the fire-escape is attached, substantially as herein shown and described, and for the purpose set forth.

5. The extension-frame T U V W, constructed as described, in combination with the frame A, ladder M N O, and chain I J K, either or both, substantially as herein shown and described, and for the purpose set forth.

6. An improved portable fire-escape, constructed, arranged, and operating substantially as herein shown and described, and for the purpose set forth.

The above specification of my invention signed by me, this 21st day of July, 1869.

HUGH C. CARRIGAN.

Witnesses:
 GEO. W. MABEE,
 JAMES T. GRAHAM.